United States Patent
Wang et al.

(10) Patent No.: US 9,760,238 B2
(45) Date of Patent: Sep. 12, 2017

(54) ELECTRONIC DEVICE AND METHOD FOR IDENTIFYING WINDOW CONTROL COMMAND IN A MULTI-WINDOW SYSTEM

(71) Applicant: INSYDE SOFTWARE CORP., Taipei (TW)

(72) Inventors: Chih-Kao Wang, Taipei (TW); Tsung-En Wu, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 852 days.

(21) Appl. No.: 14/022,371

(22) Filed: Sep. 10, 2013

(65) Prior Publication Data

US 2015/0007100 A1 Jan. 1, 2015

(30) Foreign Application Priority Data

Jun. 28, 2013 (TW) .............. 102123104 A

(51) Int. Cl.
*G06F 3/0481* (2013.01)
*G06F 3/0484* (2013.01)
*G06F 3/0485* (2013.01)
*G06F 3/01* (2006.01)
*G06F 3/0488* (2013.01)

(52) U.S. Cl.
CPC ............ *G06F 3/0481* (2013.01); *G06F 3/017* (2013.01); *G06F 3/0484* (2013.01); *G06F 3/0485* (2013.01); *G06F 3/04883* (2013.01); *G06F 2203/048* (2013.01); *G09G 2340/145* (2013.01)

(58) Field of Classification Search
CPC . G06F 2203/04806; G06F 2203/04808; G06F 3/04812; G06F 3/017; G06F 3/0485; G06F 3/0484; G09G 2340/145
See application file for complete search history.

(56) References Cited

U.S. PATENT DOCUMENTS

| | | | | |
|---|---|---|---|---|
| 5,748,926 A | * | 5/1998 | Fukuda | G06F 3/04883 345/173 |
| 2006/0224986 A1 | * | 10/2006 | Lindsay | G06F 3/0481 715/766 |
| 2007/0016875 A1 | * | 1/2007 | Santos-Gomez | G06F 3/0481 715/798 |
| 2007/0177803 A1 | * | 8/2007 | Elias | G06F 3/04883 382/188 |
| 2008/0163130 A1 | * | 7/2008 | Westerman | G06F 3/04883 715/863 |
| 2010/0211910 A1 | * | 8/2010 | Schlegel | G06F 3/0486 715/800 |

(Continued)

FOREIGN PATENT DOCUMENTS

CN 103067569 A * 4/2013

*Primary Examiner* — Steven Sax
(74) *Attorney, Agent, or Firm* — Muncy, Geissler, Olds & Lowe, P.C.

(57) ABSTRACT

An electronic device and a method are adapted to identify window control commands in a multi-window system. The electronic device displays multiple windows each respectively having a title bar on a touch interface. The electronic device executes the method to identify a window control command according to a touch gesture from a movement of a touch point detected on the title bar of one of the windows. The user can easily touch the title bar to operate a certain window.

19 Claims, 21 Drawing Sheets

(56) References Cited

U.S. PATENT DOCUMENTS

| | | | |
|---|---|---|---|
| 2011/0035656 A1* | 2/2011 | King | G06F 17/211 |
| | | | 715/234 |
| 2012/0062688 A1* | 3/2012 | Shen | G06F 3/04886 |
| | | | 348/14.03 |
| 2012/0084693 A1* | 4/2012 | Sirpal | G06F 1/1616 |
| | | | 715/769 |
| 2013/0125045 A1* | 5/2013 | Sun | G06F 3/04883 |
| | | | 715/788 |
| 2013/0283206 A1* | 10/2013 | Kim | G06F 3/0481 |
| | | | 715/788 |
| 2013/0305184 A1* | 11/2013 | Kim | G06F 3/0481 |
| | | | 715/781 |
| 2014/0033119 A1* | 1/2014 | Kim | G06F 3/0481 |
| | | | 715/800 |
| 2014/0040820 A1* | 2/2014 | Ikeda | G06F 3/04883 |
| | | | 715/800 |
| 2014/0164966 A1* | 6/2014 | Kim | G06F 3/04886 |
| | | | 715/769 |
| 2015/0268789 A1* | 9/2015 | Liao | G06F 3/0488 |
| | | | 345/173 |

\* cited by examiner

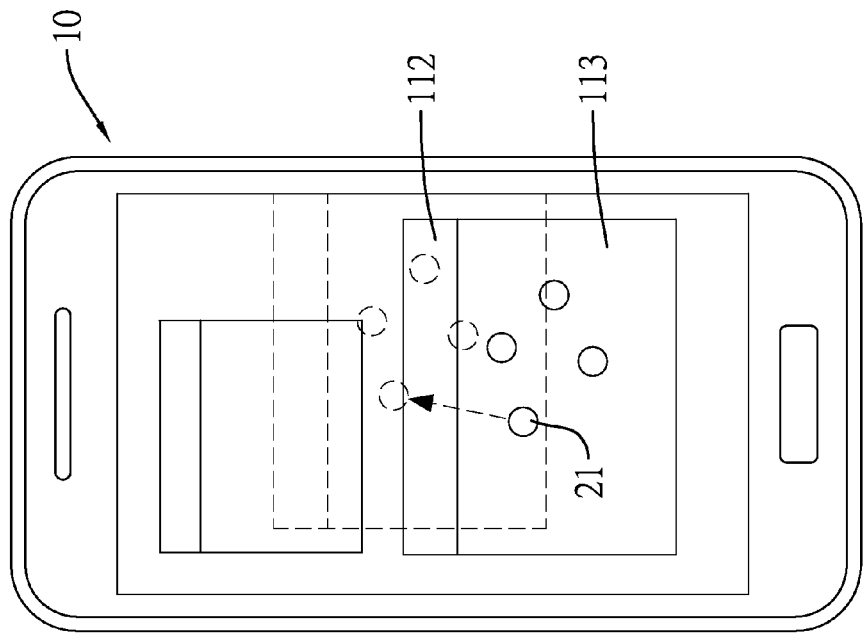
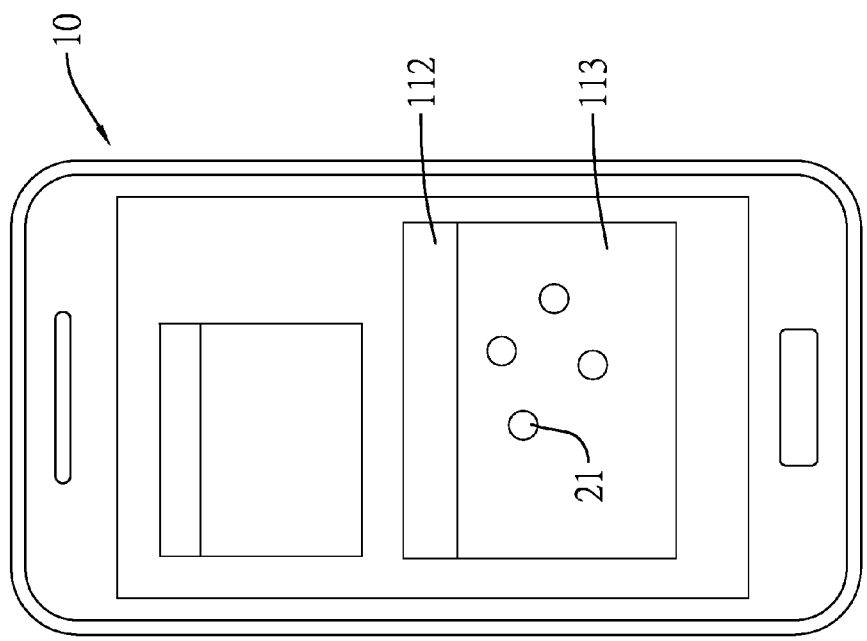
FIG.7B
FIG.7A

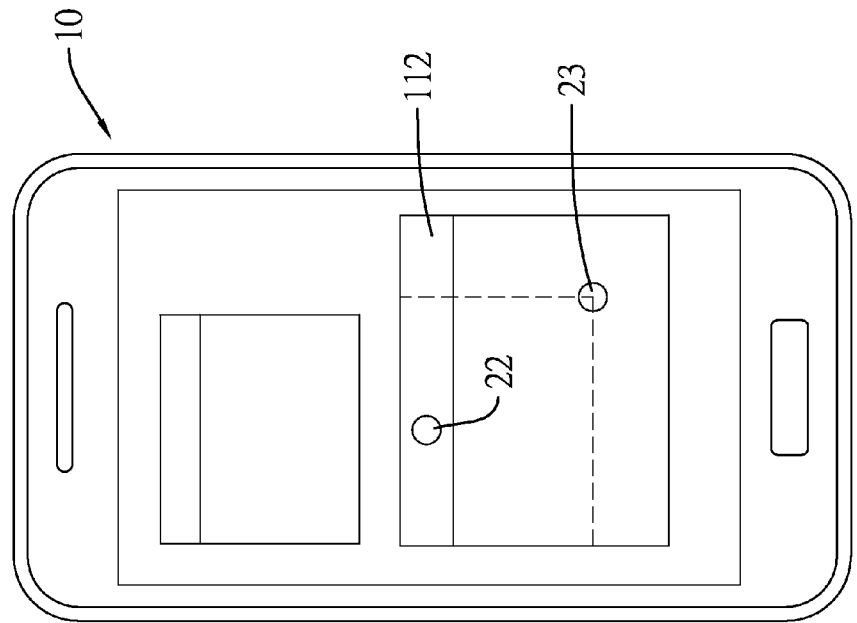
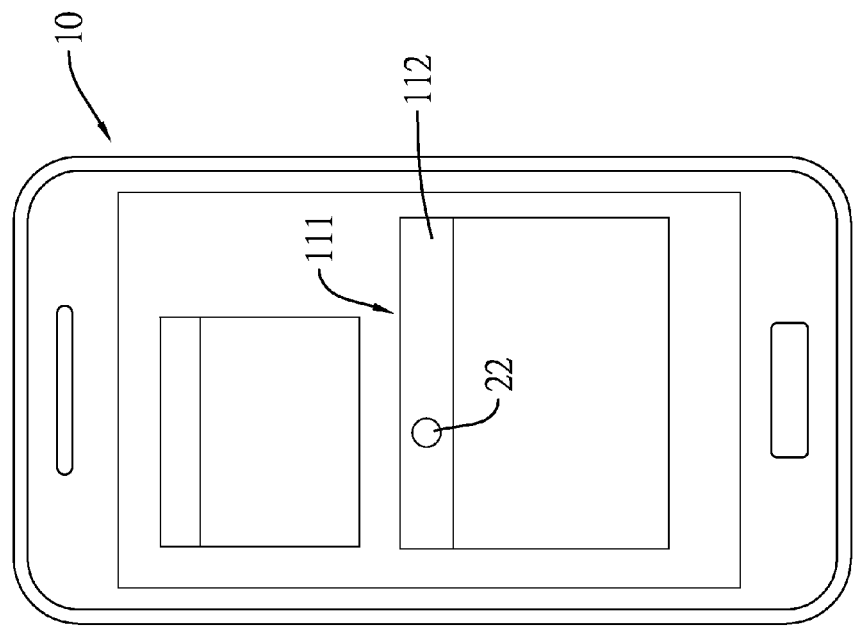

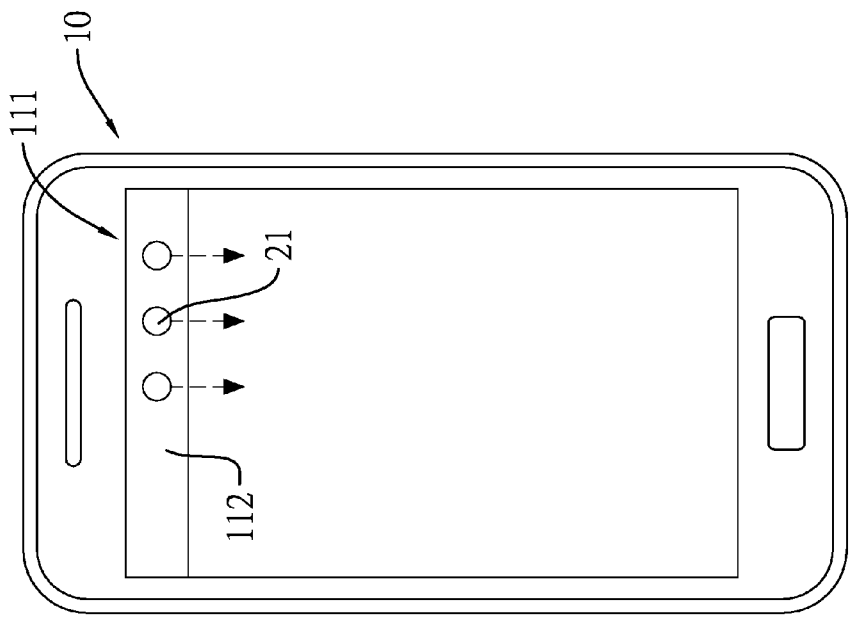
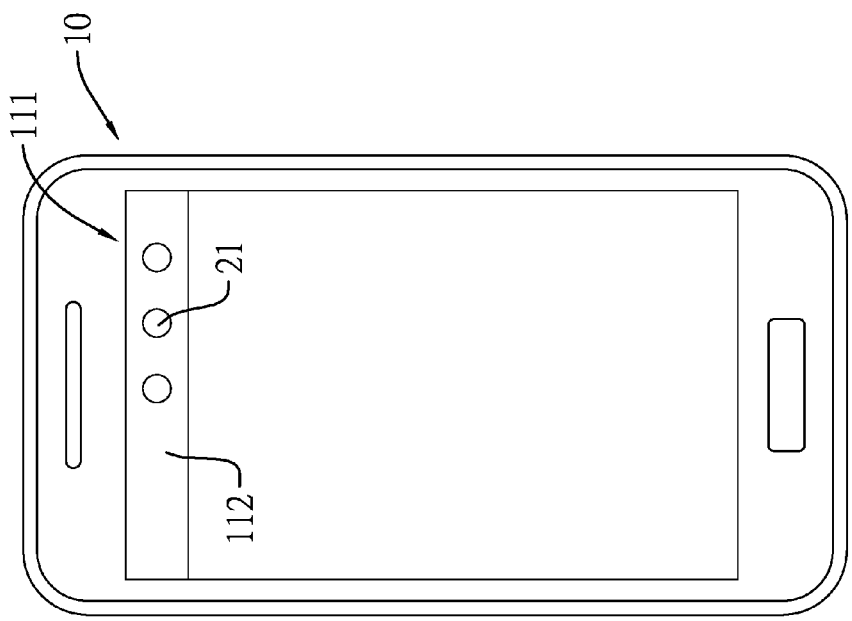
FIG.12B
FIG.12A

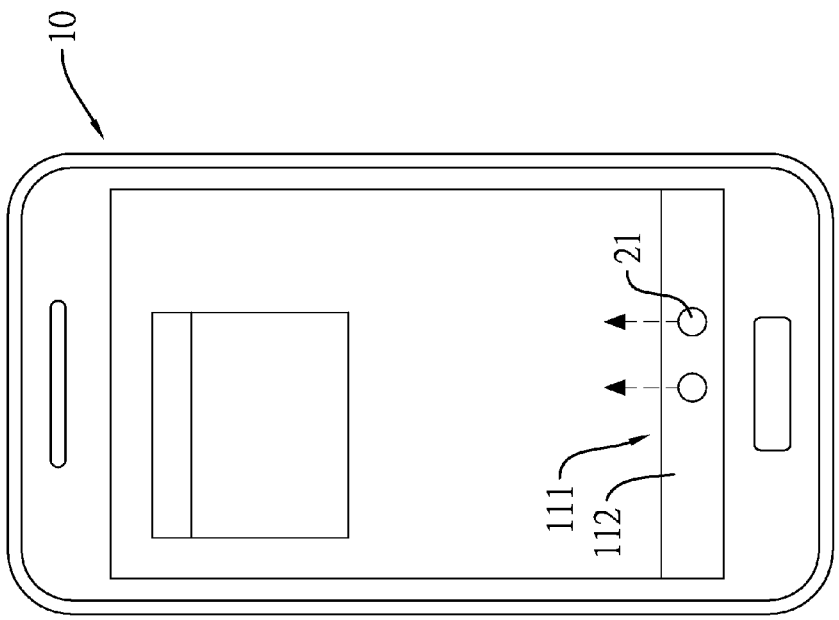
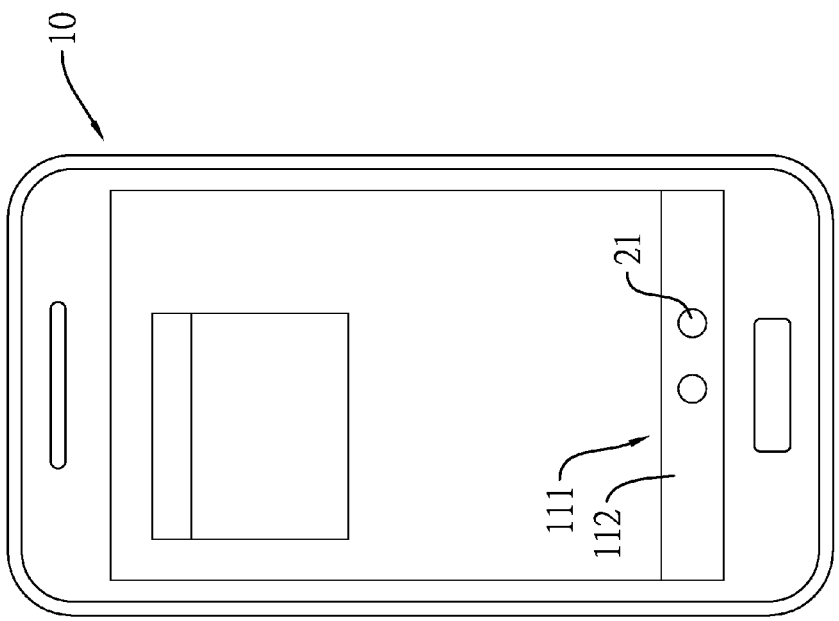

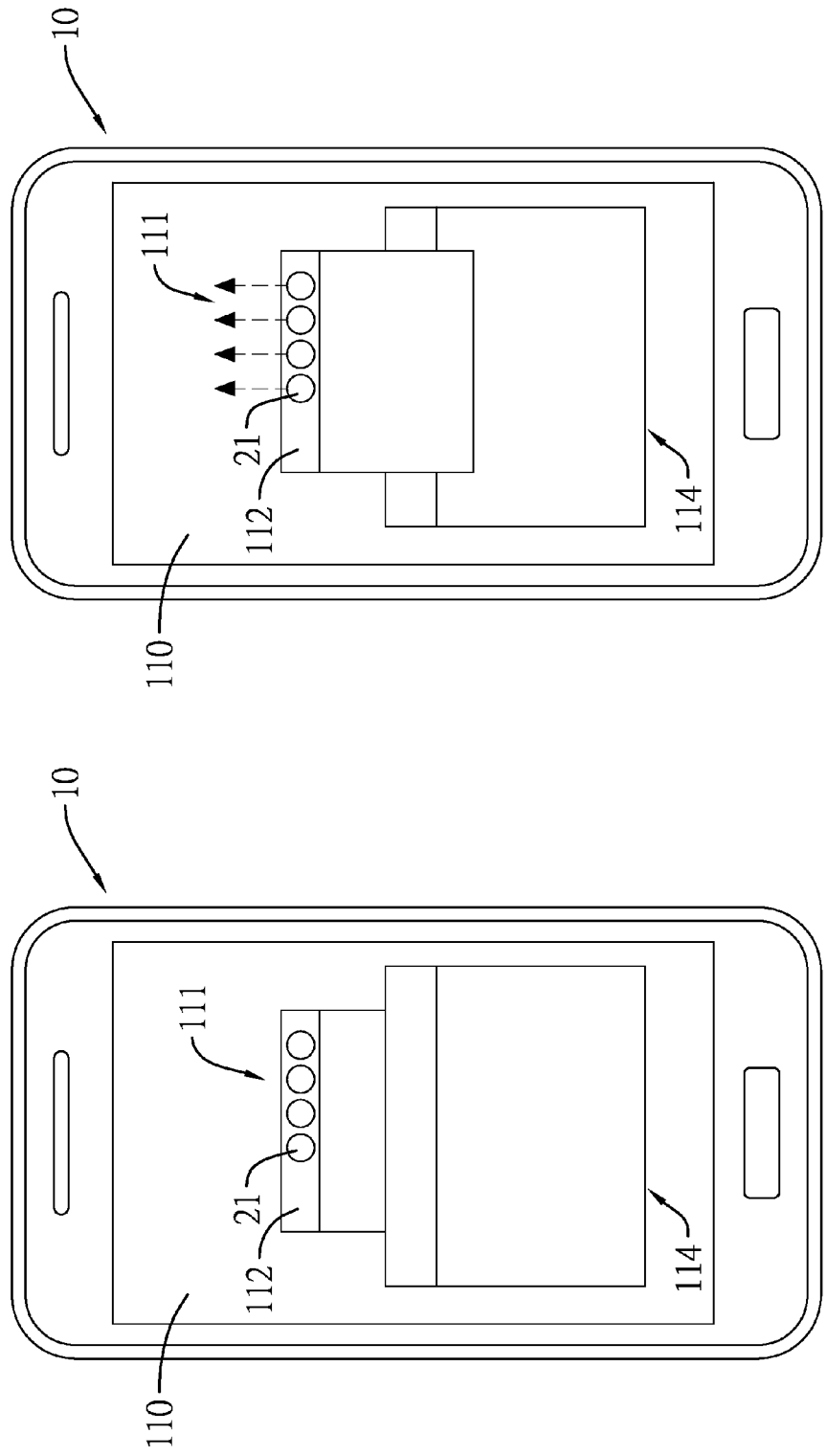

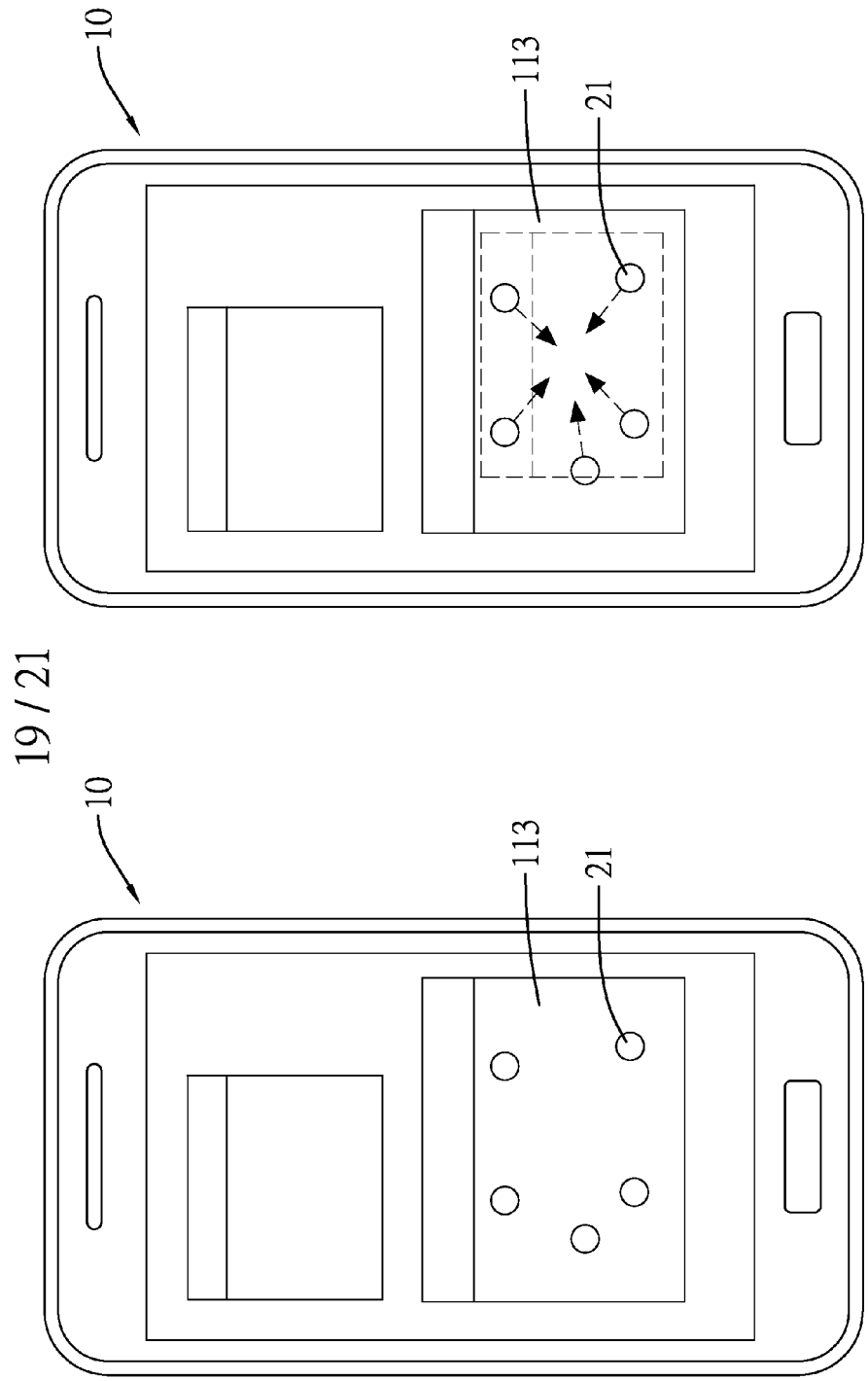

ELECTRONIC DEVICE AND METHOD FOR IDENTIFYING WINDOW CONTROL COMMAND IN A MULTI-WINDOW SYSTEM

The current application claims a foreign priority to the patent application of Taiwan No. 102123104 filed on Jun. 28, 2013.

BACKGROUND OF THE INVENTION

1. Field of the Invention

The present invention relates to a method for identifying window control commands, and more particularly to an electronic device and a method for identifying window control commands in a multi-window system.

2. Description of Related Art

Smart phones and tablets are common touch devices nowadays. The touch device mainly comprises a display panel, a touch panel and a controller. The display panel is mounted under the touch panel. The controller is electrically connected to the display panel and the touch panel. When a user touches the touch panel, the controller detects a touch point from the touch panel. The controller thus controls the display panel to update frames according to a movement of the touch point.

The display panel displays multiple windows. For example, when the user wants to scale up or down one of the windows, the user can touch an edge of the window and then drag the edge. The window is then resized according to the position of the edge dragged by the user. When the user wants to close one of the windows, the user can touch a close button on a corner of the window. The window is thus closed.

However, a touch area of the touch device is limited, such that the multiple windows may overlap each other. Therefore, it is inconvenient for the user to touch the edge or touch the cancel button of a certain window.

SUMMARY OF THE INVENTION

An objective of the present invention is to provide an electronic device and method for identifying window control command in a multi-window system. The user can easily operate the windows on the electronic device.

The method of the present invention is executed by an electronic device having a touch interface displaying multiple windows each respectively having a title bar. The method comprises the steps of:

detecting a touch point on the touch interface;

determining whether the touch point is on the title bar of a touched window selected from the multiple windows;

determining whether a movement of the touch point forms a touch gesture when the touch point is on the title bar of the touched window; and executing a window control command according to the touch gesture when the touch gesture is identified.

The electronic device of the present invention has:

a touch interface; and a controller electrically connected to the touch interface and controlling the touch interface to display multiple windows, each window having a title bar, wherein the controller executes a window control command according to a touch gesture from a movement of a touch point detected on the title bar of one of the multiple windows.

In conclusion, when the user wants to operate one of the windows, the user can touch the title bar of the window and then perform a touch gesture to directly control the touched window. The title bar of each window is obviously visible. The user can touch the title bar without difficulty, such that the user can easily and directly operate the windows.

BRIEF DESCRIPTION OF THE DRAWINGS

FIGS. 7A-7B are diagrams for a touch gesture according to a window-moving command;

FIGS. 8A-8B are diagrams for a touch gesture according to a window-scaling command;

FIGS. 12A-12B are diagrams for a touch gesture according to a window-minimizing command;

FIGS. 14A-14B are diagrams for a touch gesture according to a window-restoring command;

FIGS. 16A-16B are diagrams for a touch gesture according to a window-topmost-mode command;

FIGS. 19A-19B are diagrams for a touch gesture according to a window-scale-down command;

DETAILED DESCRIPTION OF THE PREFERRED EMBODIMENT

Figure 1:
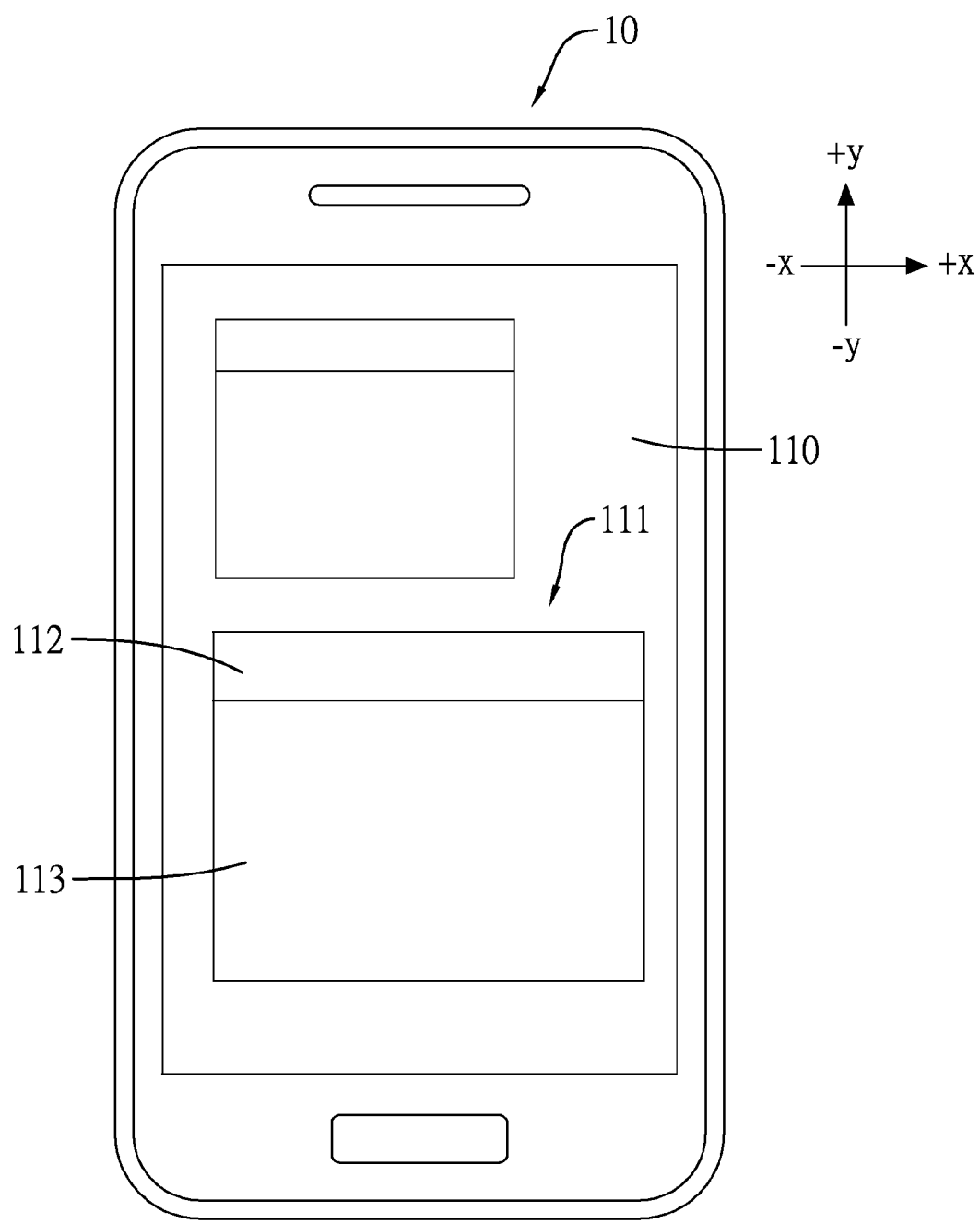
FIG. 1 is a diagram of an electronic device displaying multiple windows.
Figure 2:
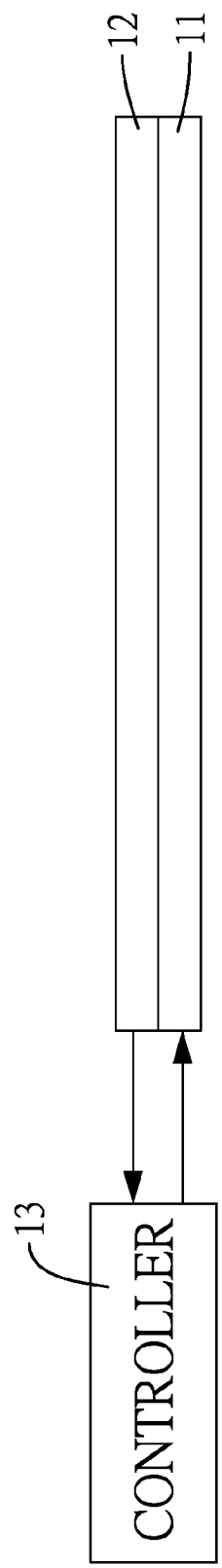
FIG. 2 is a circuit block diagram of the electronic device of the present invention.

With reference to FIGS. 1 and 2, an electronic device 10 of the present invention comprises a touch interface and a controller 13. The touch interface comprises a display panel 11 and a touch panel 12. The display panel 11 is mounted under the touch panel 12 and has a visible area 110 for displaying information to a user. The controller 13 is electrically connected to the display panel 11 and the touch panel 12. The controller 13 defines a +x edge, a −x edge, a +y edge and a −y edge on the visible area 110 of the electronic device 10. When the user looks straight at the display panel 12 from a front of the display panel, the +x edge corresponds to the user's right side, the −x edge corresponds to the user's left side, the +y edge corresponds to the user's head, and the −y edge is opposite to the +y edge. In this embodiment, the controller 13 is operated under Android system.

Figure 3:
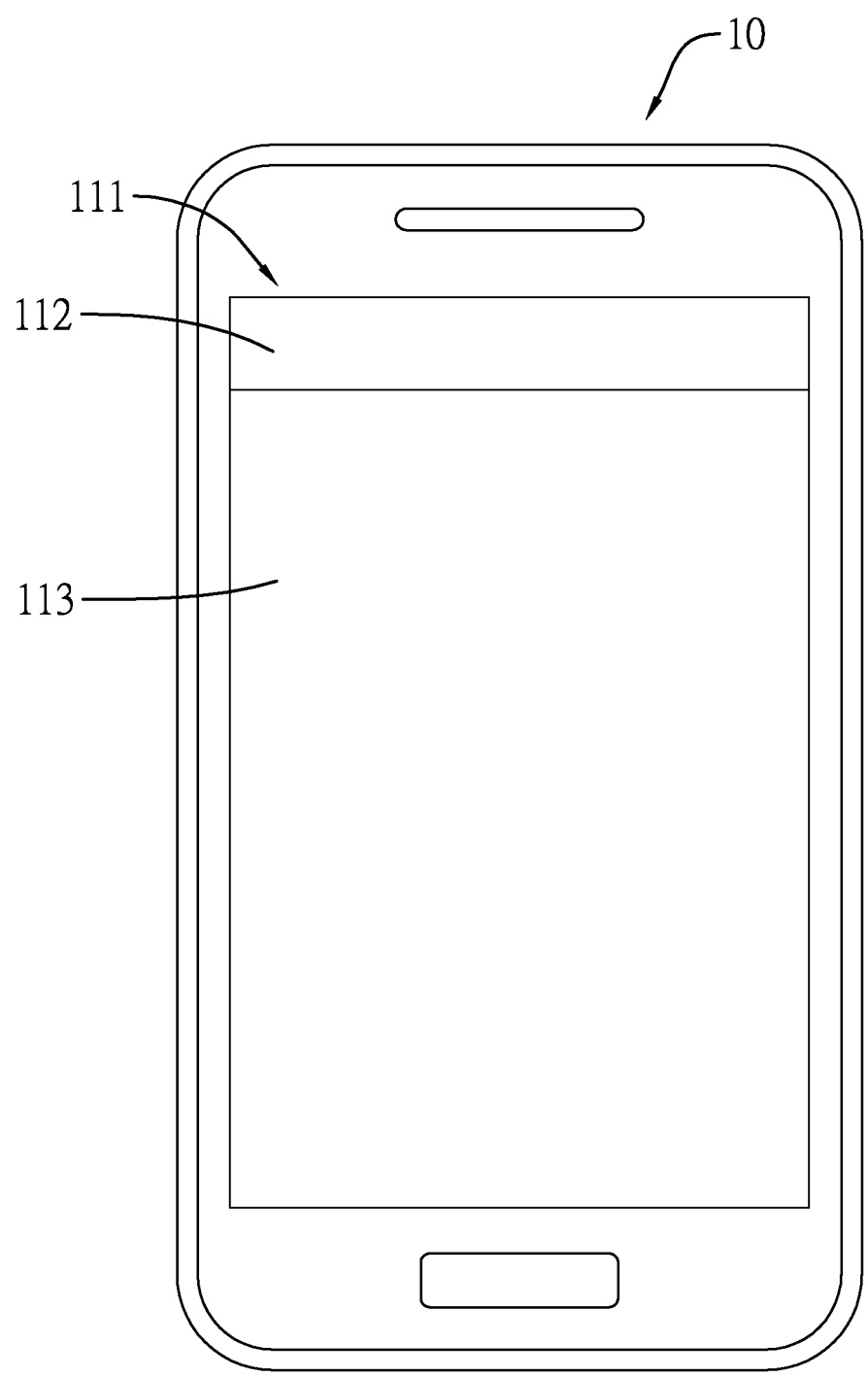
FIG. 3 is a diagram of a window operated in the maximum mode.
Figure 4:
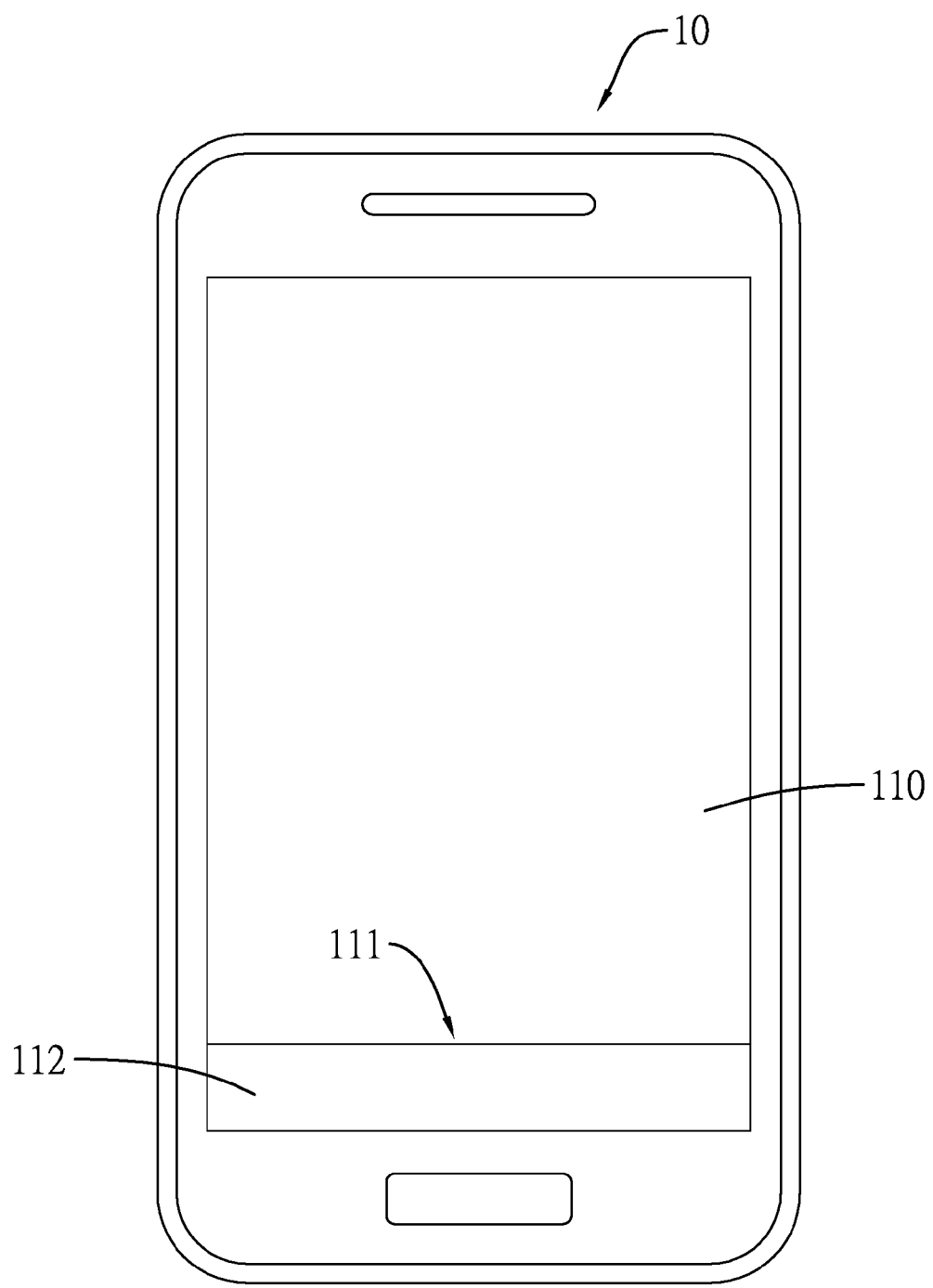
FIG. 4 is a diagram of a window operated in the minimum mode.
Figure 5:
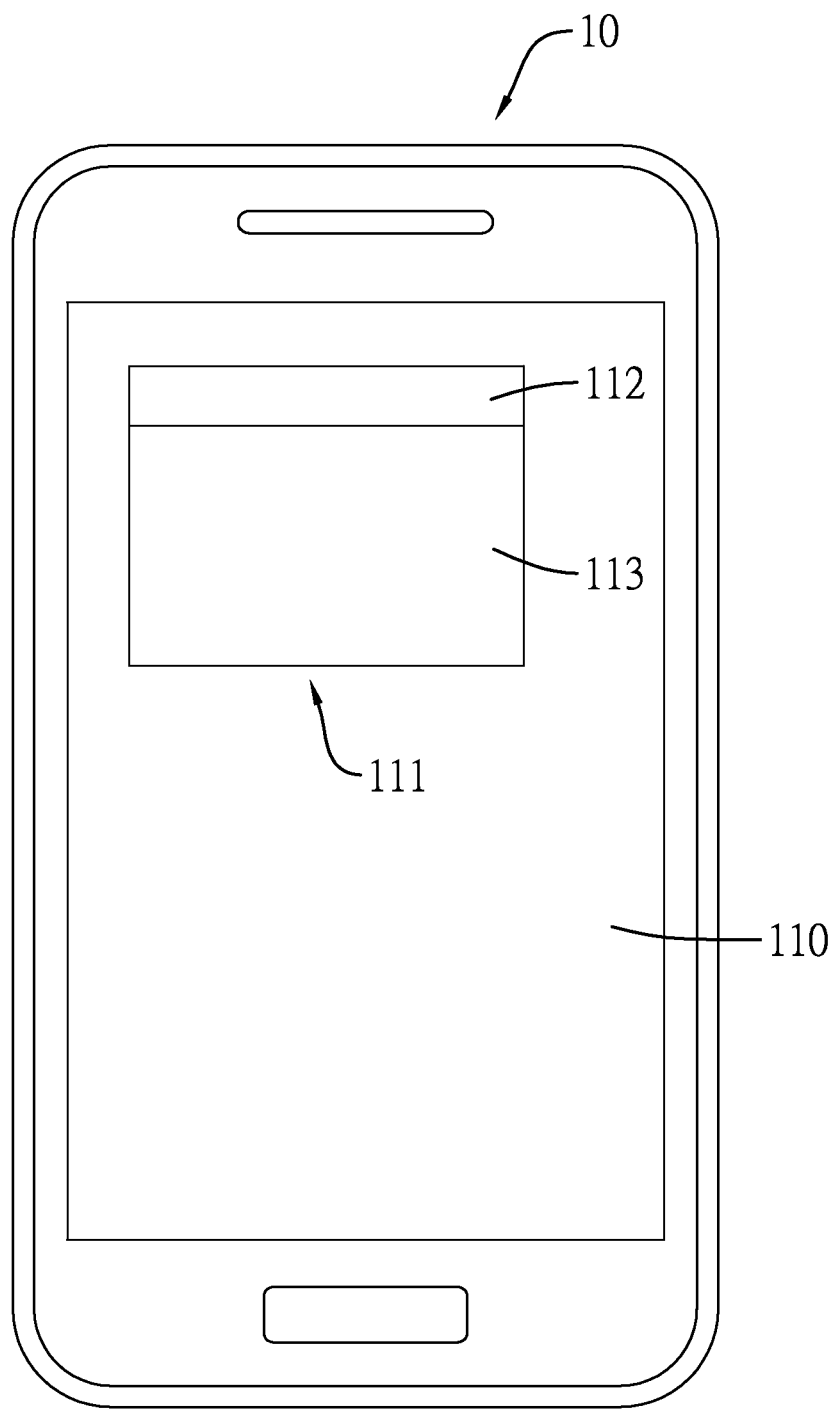
FIG. 5 is a diagram of a window operated in the restore mode.

With reference to FIG. 1, the controller 13 controls the display panel 11 to display multiple windows 111 in the visible area 110. Each window 111 has a title bar 112 and an information region 113 adjacent to the title bar 112. The window 111 can be resized to a maximum mode, a minimum mode or a restore mode. With reference to FIG. 3, when the window 111 is operated in the maximum mode, the window 111 fills up the visible area 110, and the title bar 112 of the window 111 is located on the +y edge of the visible area 110. With reference to FIG. 4, when the window 111 is operated in the minimum mode, the title bar 112 is only displayed on the −y edge of the visible area 110. With reference to FIG. 5, when the window 111 is operated in the restore mode, the window 111 can be located at any position on the visible area 110.

With reference to FIG. 1, the visible area 110 displays multiple windows 111. When the user touches the touch panel 12, the controller 13 can detect a touch point. The controller 13 determines whether the touch point is on the title bar 112 of a touched window 111. When the touch point is on the title bar 112 of the touched window 111, the controller 13 then determines whether a movement of the touch point forms a touch gesture. When the touch gesture is identified, the controller 13 thus executes a window control command according to the touch gesture. The following description discloses methods for identifying window control commands.

1. Window-moving Command (1)

Figure 6B:
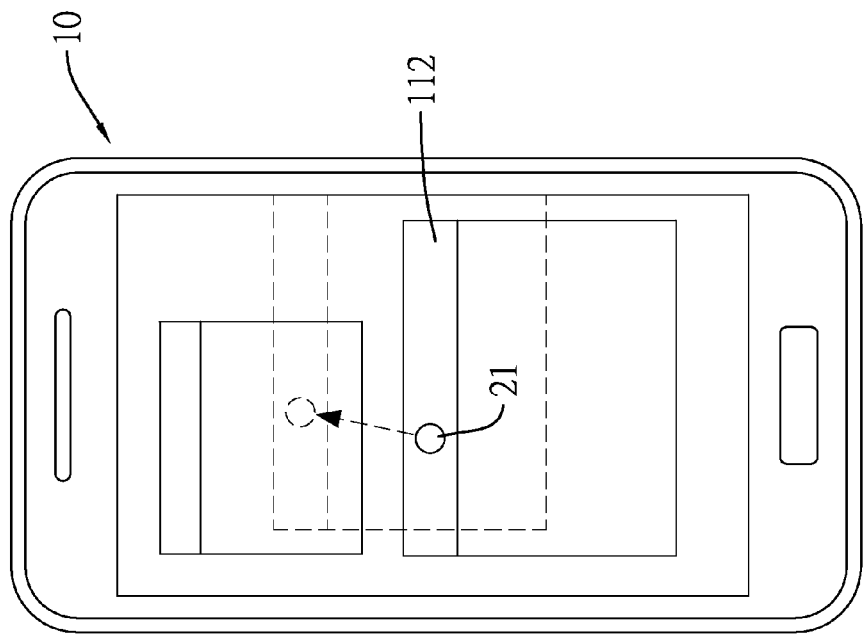
FIGS. 6A-6B are diagrams for a touch gesture according to a window-moving command.
Figure 6A:
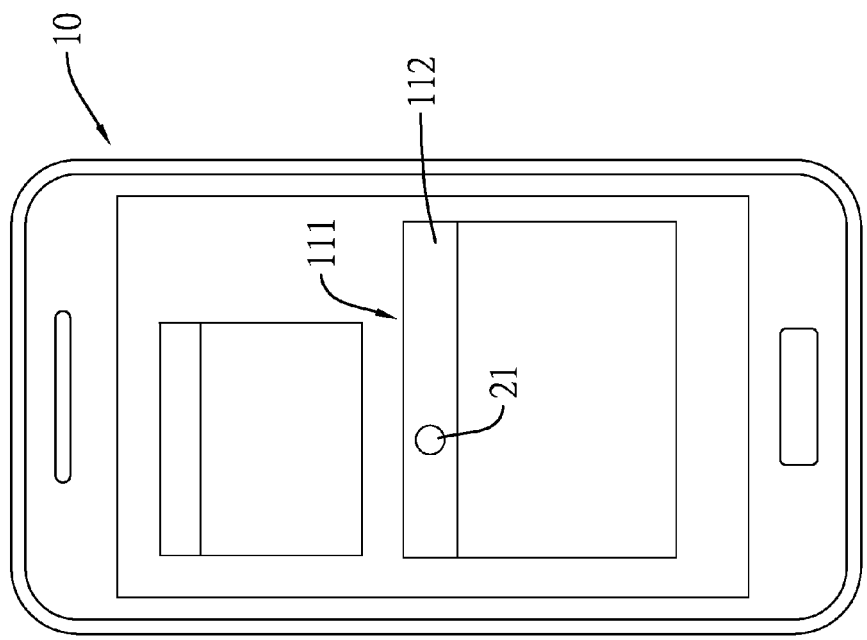

With reference to FIG. 6A, the controller 13 detects a touch point 21 on the title bar 112 of a touched window 111 from the touch panel 12, which means the user's finger is touching the title bar 112.

When the controller 13 detects the touch point 21, the controller 13 determines whether the touched window 111 is operated in the restore mode.

When the controller 13 determines that the touched window 111 is operated in the restore mode, the controller 13 determines whether the touch point 21 moves along a trace as a touch gesture.

When the touch point 21 moves along the trace, which means the user's finger drags on the touch panel 12, the controller 13 identifies the window control command as a window-moving command. With reference to FIG. 6B, the position of the touched window 111 is thus moved according to the positions of the touch point 21.

2. Window-moving Command (2)

With reference to FIG. 7A, when no touch point is detected on the title bar 112 of any one of the multiple windows but four touch points 21 are detected on the information region 113 of one of the windows, which means four of the user's fingers are touching the window, the controller 13 determines whether the window touched by the four touch points 21 is operated in the restore mode.

With reference to FIG. 7B, when the window touched by the four touch points 21 is operated in the restore mode, the controller 13 determines whether the four touch points 21 move along a trace as a touch gesture.

When the four touch points 21 move along the trace, which means four of the user's fingers drag on the touch panel 12, the controller 13 identifies the window control command as the window-moving command. With reference to FIG. 7B, the position of the window touched by the four touch points 21 is thus moved according to the positions of the four touch points 21.

3. Window-scaling Command

With reference to FIG. 8A, the controller 13 detects a first touch point 22 on the title bar 112 of a touched window 111 from the touch panel 12, which means the user's finger is touching the title bar 112. The controller 13 determines whether the touched window 111 is operated in the restore mode.

With reference to FIG. 8B, when the touched window 111 is operated in the restore mode and the first touch point 22 still exists, the controller 13 determines whether a second touch point 23 is detected on the touch panel 12 excluded from the title bar 112 of the touched window 111 to form a touch gesture.

When the second touch point 23 is detected, the controller 13 identifies the window control command as a window-scaling command. A position of a corner near the +x edge and the −y edge of the touched window 111 is adjusted to the position of the second touch point 23. A position of a corner near the −x edge and the +y edge of the touched window 111 is fixed. As a result, the touched window 111 will be scaled down if the second touch point 23 is located within the touched window 111. The touched window 111 will be scaled up if the second touch point 23 is located out of the touched window 111.

4. Window-maximizing Command (1)

Figure 9B:
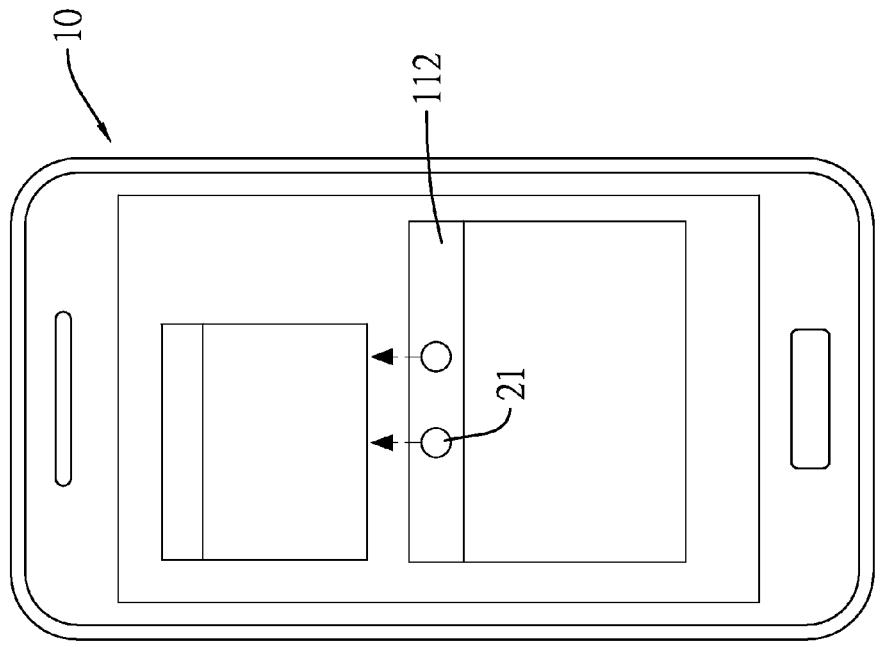
FIGS. 9A-9B are diagrams for a touch gesture according to a window-maximizing command.
Figure 9A:
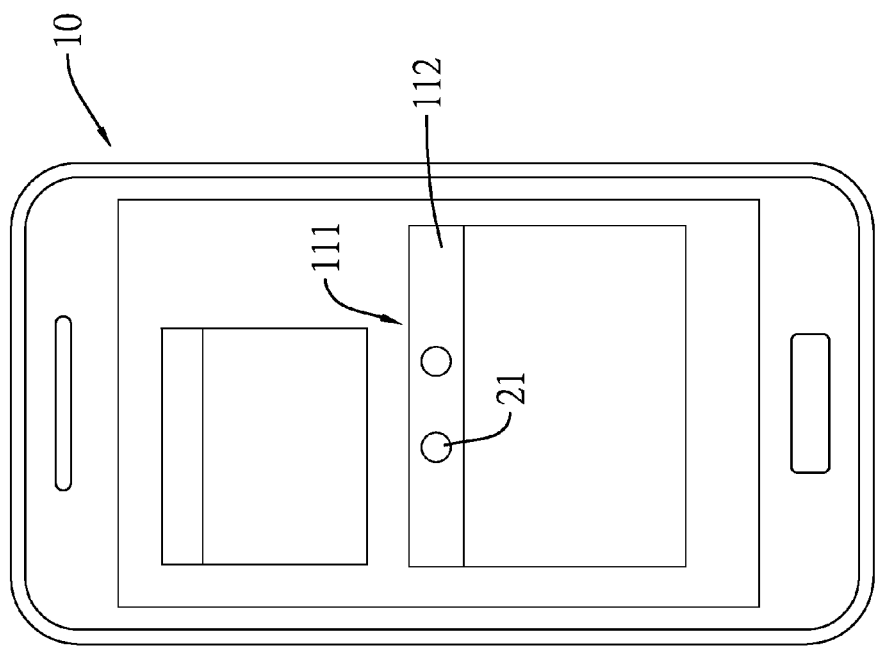

With reference to FIG. 9A, the controller 13 detects two or three touch points 21 on the title bar 112 of a touched window 111, which means two or three of the user's fingers are touching the title bar 112. Two touch points 21 are shown in FIG. 9A as an example.

When the controller 13 detects the two or three touch points 21, the controller 13 determines whether the touched window 111 is operated in the restore mode.

When the controller 13 determines that the touched window 111 is operated in the restore mode, the controller 13 determines whether the two or three touch points 21 move toward the +y edge of the visible area 110 as a touch gesture.

With reference to FIG. 9B, when the two or three touch points 21 move toward the +y edge of the visible area 110, the controller 13 identifies the window control command as a window-maximizing command. The controller 13 thus controls the touched window 111 to be resized to the maximum mode.

5. Window-maximizing Command (2)

Figure 10B:
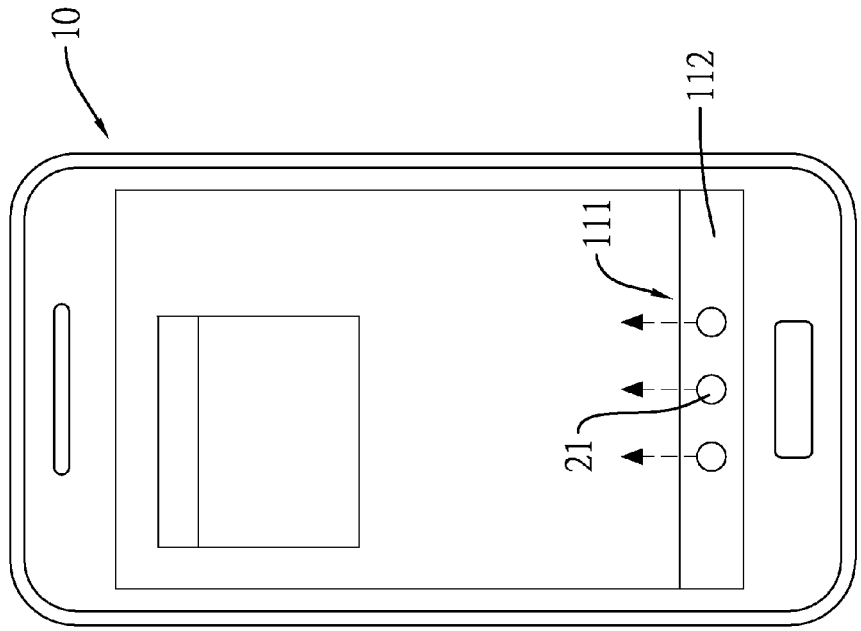
FIGS. 10A-10B are diagrams for a touch gesture according to a window-maximizing command.
Figure 10A:
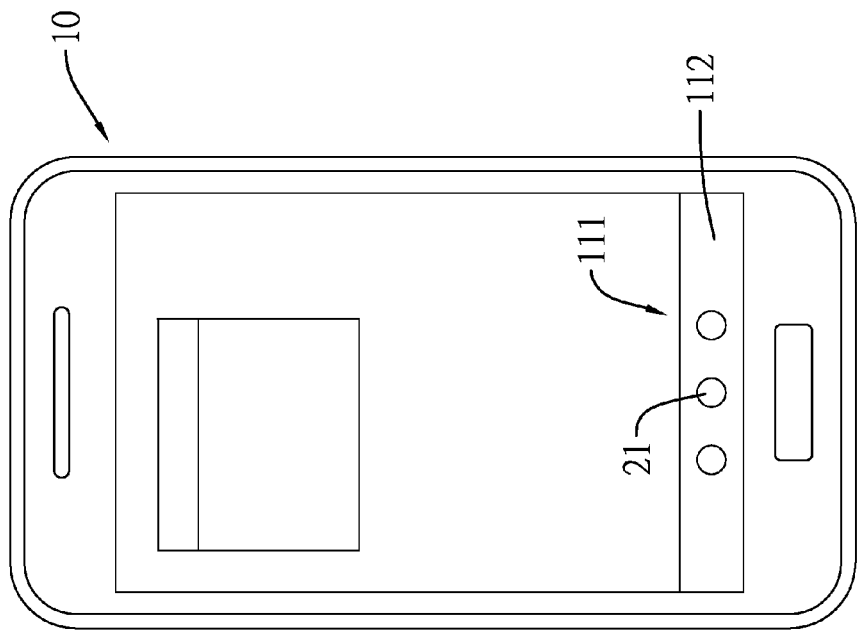

With reference to FIG. 10A, the controller 13 detects three touch points 21 on the title bar 112 of a touched window 111, which means three of the user's fingers are touching the title bar 112.

When the controller 13 detects the three touch points 21, the controller 13 determines whether the touched window 111 is operated in the minimum mode.

When the controller 13 determines that the touched window 111 is operated in the minimum mode, the controller 13 determines whether the three touch points 21 move toward the +y edge of the visible area 110 as a touch gesture.

With reference to FIG. 10B, when the three touch points 21 move toward the +y edge of the visible area 110, the controller 13 identifies the window control command as a window-maximizing command. The controller 13 thus controls the touched window 111 to be resized to the maximum mode.

6. Window-minimizing Command (1)

Figure 11A:
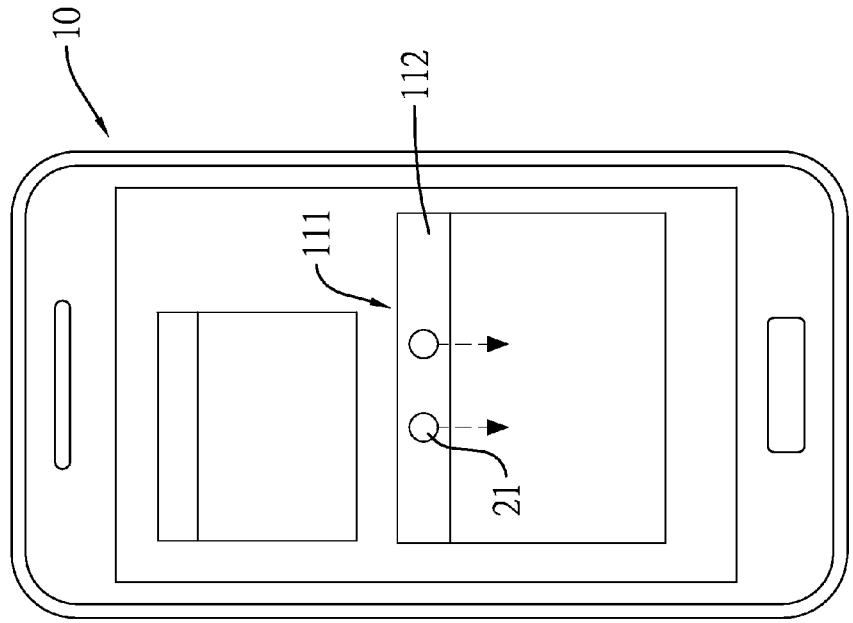
FIGS. 11A-11B are diagrams for a touch gesture according to a window-minimizing command.

With reference to FIG. 11A, the controller 13 detects two or three touch points 21 on the title bar 112 of a touched window 111, which means two or three of the user's fingers are touching the title bar 112. Two touch points 21 are shown in FIG. 11A as an example.

When the controller 13 detects the two or three touch points 21, the controller 13 determines whether the touched window 111 is operated in the restore mode.

When the controller 13 determines that the touched window 111 is operated in the restore mode, the controller 13 determines whether the two or three touch points 21 move toward the −y edge of the visible area 110 as a touch gesture.

Figure 11B:
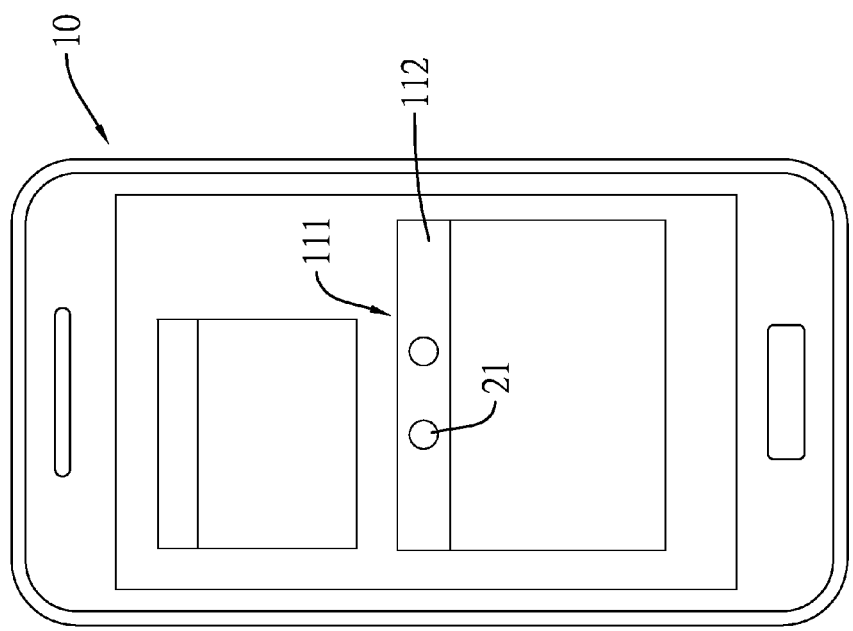

With reference to FIG. 11B, when the two or three touch points 21 move toward the −y edge of the visible area 110, the controller 13 identifies the window control command as a window-minimizing command. The controller 13 thus controls the touched window 111 to be resized to the minimum mode.

7. Window-minimizing Command (2)

With reference to FIG. 12A, the controller 13 detects three touch points 21 on the title bar 112 of a touched window 111, which means three of the user's fingers are touching the title bar 112.

When the controller 13 detects the three touch points 21, the controller 13 determines whether the touched window 111 is operated in the maximum mode.

When the controller 13 determines that the touched window 111 is operated in the maximum mode, the controller 13 determines whether the three touch points 21 move toward the −y edge of the visible area 110 as a touch gesture.

With reference to FIG. 12B, when the three touch points 21 move toward the −y edge of the visible area 110, the controller 13 identifies the window control command as a window-minimizing command. The controller 13 thus controls the touched window 111 to be resized to the minimum mode.

8. Window-restoring Command (1)

Figure 13A:
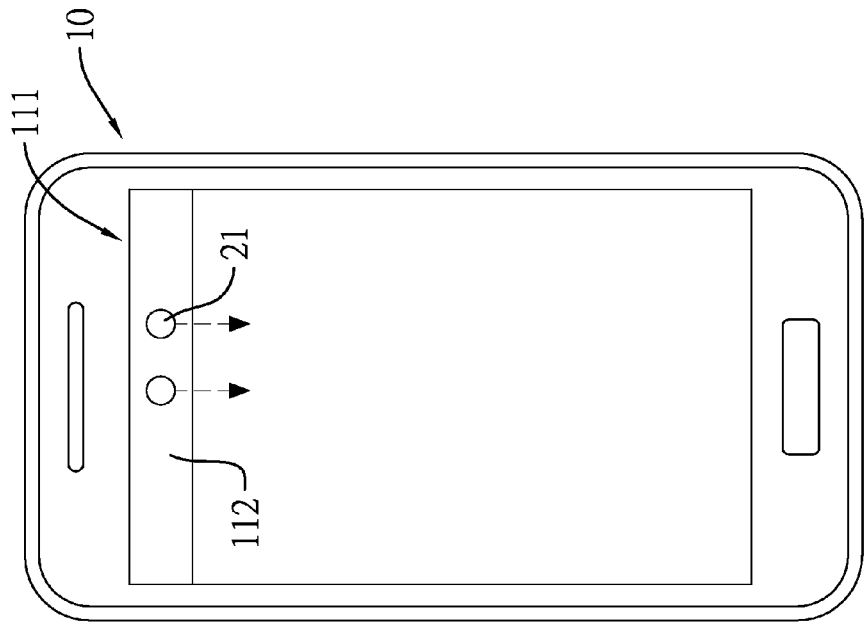
FIGS. 13A-13B are diagrams for a touch gesture according to a window-restoring command.

With reference to FIG. 13A, the controller 13 detects two touch points 21 on the title bar 112 of a touched window 111, which means two of the user's fingers are touching the title bar 112.

When the controller 13 detects the two touch points 21, the controller 13 determines whether the touched window 111 is operated in the maximum mode.

When the controller 13 determines that the touched window 111 is operated in the maximum mode, the controller 13 determines whether the two touch points 21 move toward the −y edge of the visible area 110 as a touch gesture.

Figure 13B:
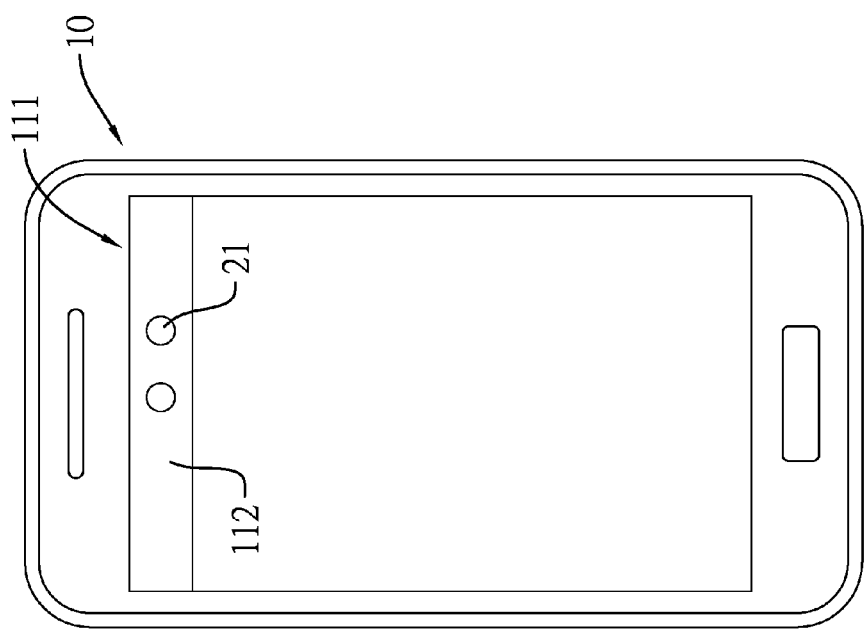

With reference to FIG. 13B, when the two touch points 21 move toward the −y edge of the visible area 110, the controller 13 identifies the window control command as a window-restoring command. The controller 13 thus controls the touched window 111 to be resized to the restore mode.

9. Window-restoring Command (2)

With reference to FIG. 14A, the controller 13 detects two touch points 21 on the title bar 112 of a touched window 111, which means two of the user's fingers are touching the title bar 112.

When the controller 13 detects the two touch points 21, the controller 13 determines whether the touched window 111 is operated in the minimum mode.

When the controller 13 determines that the touched window 111 is operated in the minimum mode, the controller 13 determines whether the two touch points 21 move toward the +y edge of the visible area 110 as a touch gesture.

With reference to FIG. 14B, when the two touch points 21 move toward the +y edge of the visible area 110, the controller 13 identifies the window control command as a window-restoring command. The controller 13 thus controls the touched window 111 to be resized to the restore mode.

10. Window-closing Command

Figure 15B:
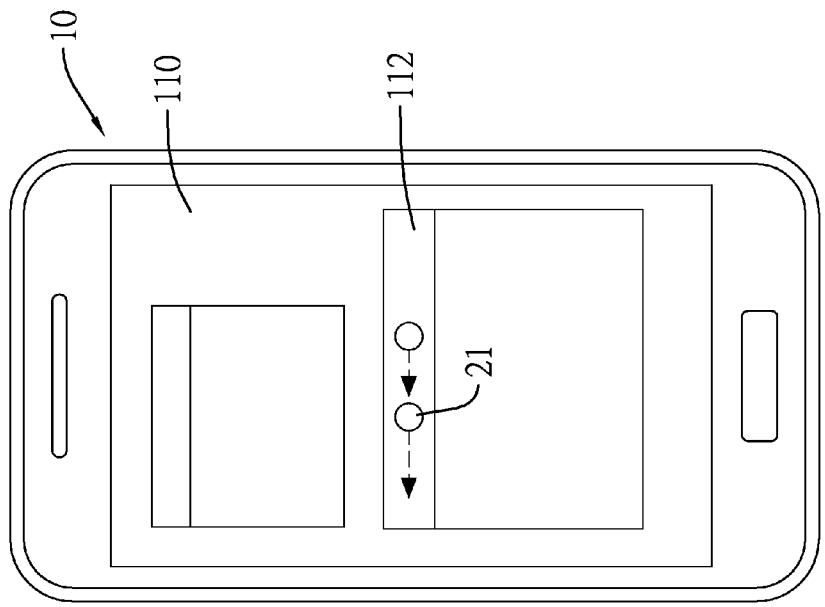
FIGS. 15A-15B are diagrams for a touch gesture according to a window-closing command.
Figure 15A:
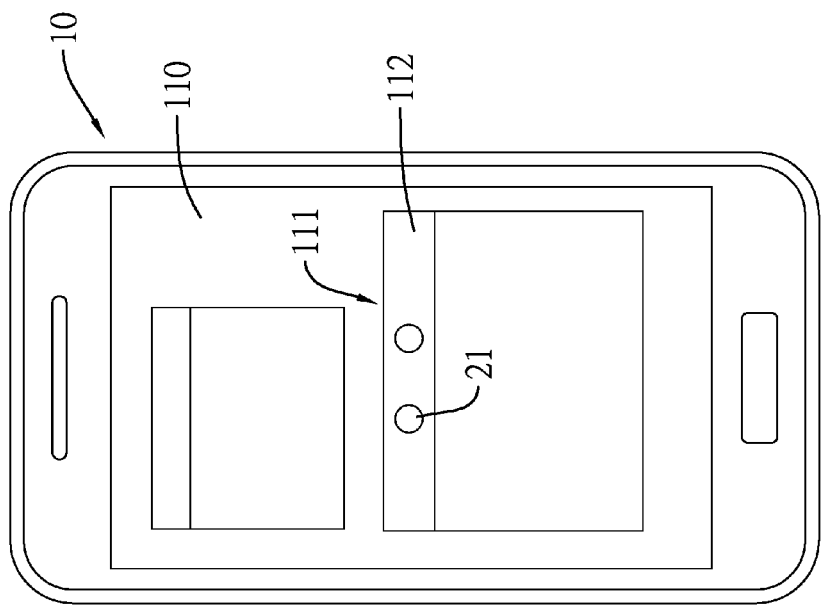

With reference to FIG. 15A, the controller 13 detects at least two touch points 21 on the title bar 112 of a touched window 111, which means at least two of the user's fingers are touching the title bar 112. The controller 13 then determines whether the at least two touch points 21 move toward the +x edge of the visible area 110 or the −x edge of the visible area 110 as a touch gesture. Two touch points 21 are shown in FIG. 15A as an example. With reference to FIG. 15B, the two touch points 21 move toward the −x edge of the visible area 110 as an example.

When the controller 13 determines that the at least two touch points 21 move toward the −x edge or the +x edge of the visible area 110, the controller 13 identifies the window control command as a window-closing command. The controller 13 thus closes the touched window 111 from the visible area 110.

11. Window-topmost-mode Command

With reference to FIG. 16A, the controller 13 detects four touch points 21 on the title bar 112 of a touched window 111, which means four of the user's fingers are touching the title bar 112. The controller 13 then determines whether the four fingers move toward the +y edge of the visible area 110 as a touch gesture.

With reference to FIG. 16B, when the four fingers move toward the +y edge of the visible area 110, the controller 13 identifies the window control command as a window-topmost-mode command. The controller 13 thus controls the touched window 111 to be operated in a topmost mode. The touched window 111 in the topmost mode can cover or overlap the rest of windows on the visible area 110.

12. Window-topmost-mode Disabling Command

Figure 17B:
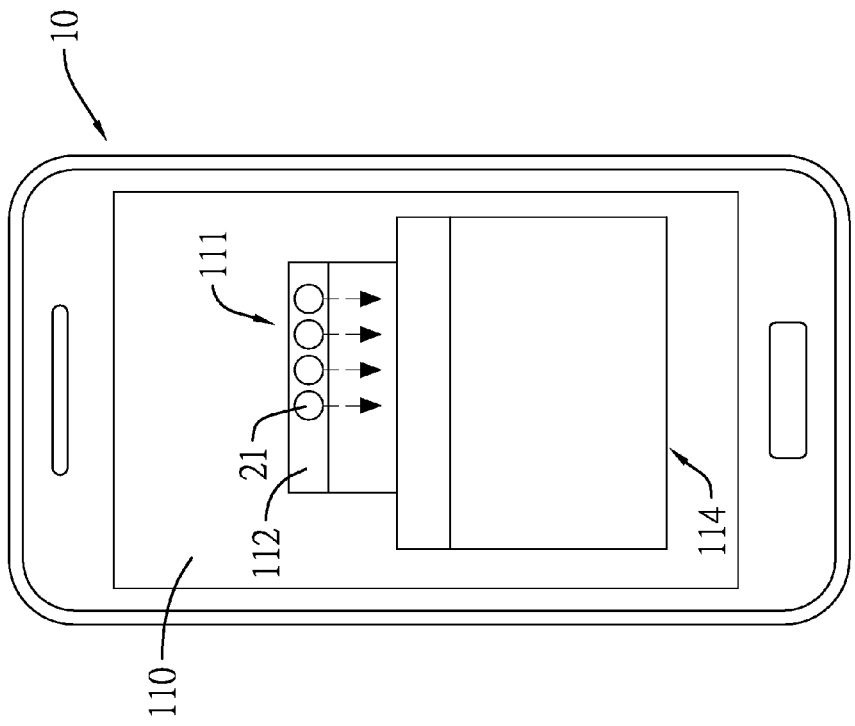
FIGS. 17A-17B are diagrams for a touch gesture according to a window-topmost-mode disabling command.
Figure 17A:
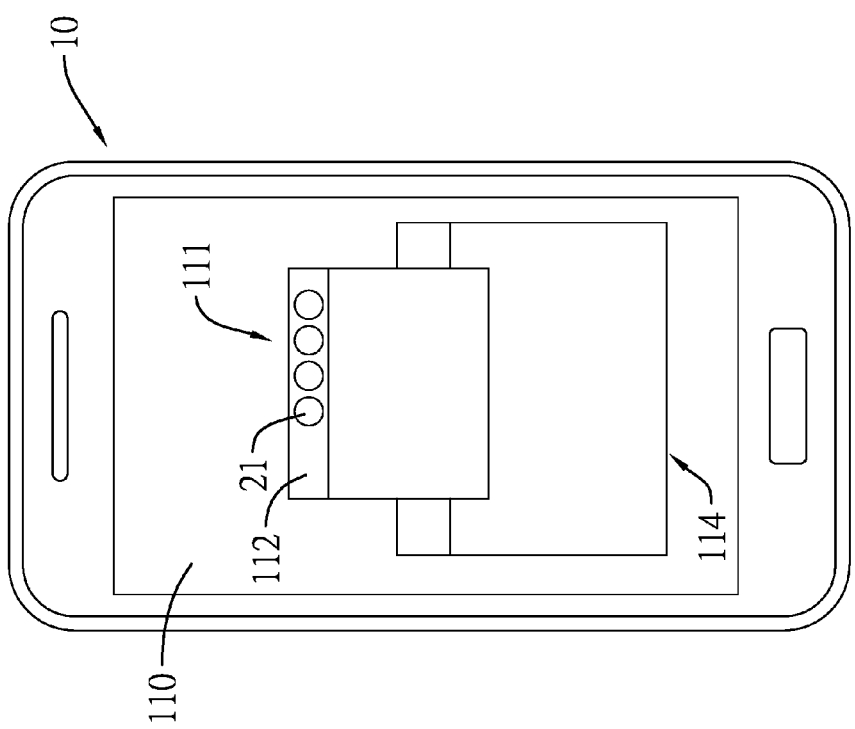

With reference to FIG. 17A, the controller 13 detects four touch points 21 on the title bar 112 of a touched window 111, which means four of the user's fingers are touching the title bar 112. The controller 13 then determines whether the four fingers move toward the −y edge of the visible area 110 as a touch gesture.

With reference to FIG. 17B, when the four fingers move toward the −y edge of the visible area 110, the controller 13 identifies the window control command as a window-topmost-mode disabling command. The controller 13 thus disables the topmost mode from the touched window 111. The touched window 111 can be covered or overlapped by the rest of windows 114 on the visible area 110.

13. Window-scale-up Command

Figure 18B:
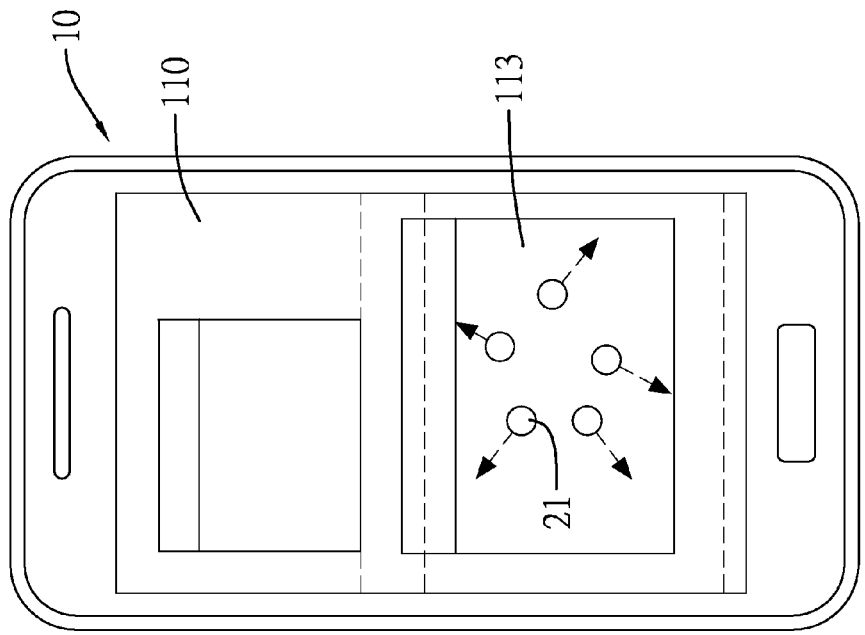
FIGS. 18A-18B are diagrams for a touch gesture according to a window-scale-up command.
Figure 18A:
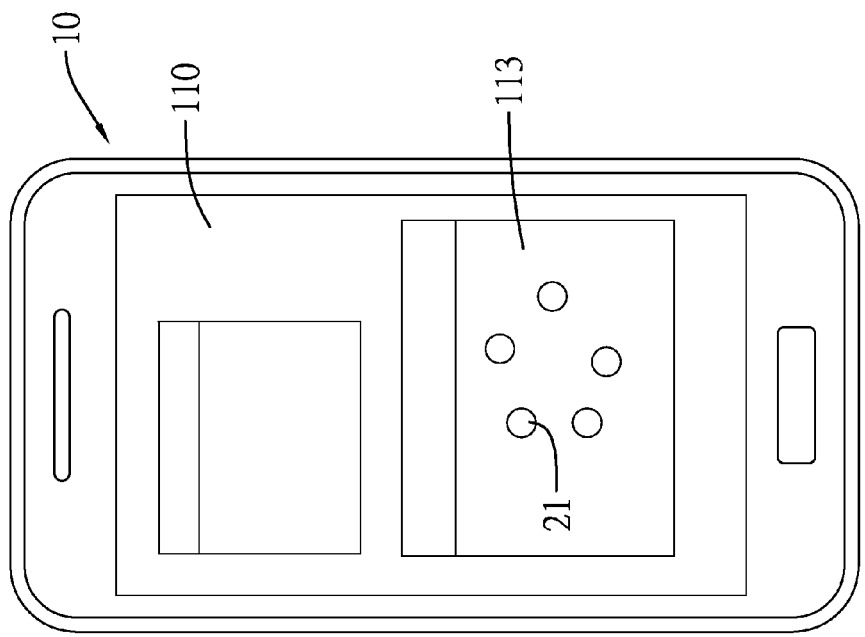

With reference to FIG. 18A, when no touch point is detected on the title bar of any one of the multiple windows but five touch points 21 are detected on the information region 113 of one of the windows, which means five of the user's fingers are touching the display panel 11, the controller 13 determines whether the window touched by the touch points 21 is operated in the restore mode.

When the window touched by the touch points 21 is operated in the restore mode, the controller 13 determines whether the five touch points 21 move away from each other as a touch gesture. With reference to FIG. 18B, when the five touch points 21 move away from each other, the controller 13 executes a window-scale-up command. The window touched by the touch points 21 is thus scaled up according to the positions of the five touch points 21.

14. Window-scale-down Command

With reference to FIG. 19A, when no touch point is detected on the title bar of any one of the multiple windows but five touch points 21 are detected on the information region 113 of one of the windows, which means five of the user's fingers are touching the display panel 11, the controller 13 determines whether the window touched by the touch points 21 is operated in the restore mode.

When the window touched by the touch points 21 is operated in the restore mode, the controller 13 determines whether the five touch points 21 move approaching each other as a touch gesture. With reference to FIG. 19B, when the five touch points 21 move approaching each other, the controller 13 executes a window-scale-down command. The window touched by the touch points 21 is thus scaled down according to the positions of the five touch points 21.

15. Window-edge-adjusting Command

Figure 20B:
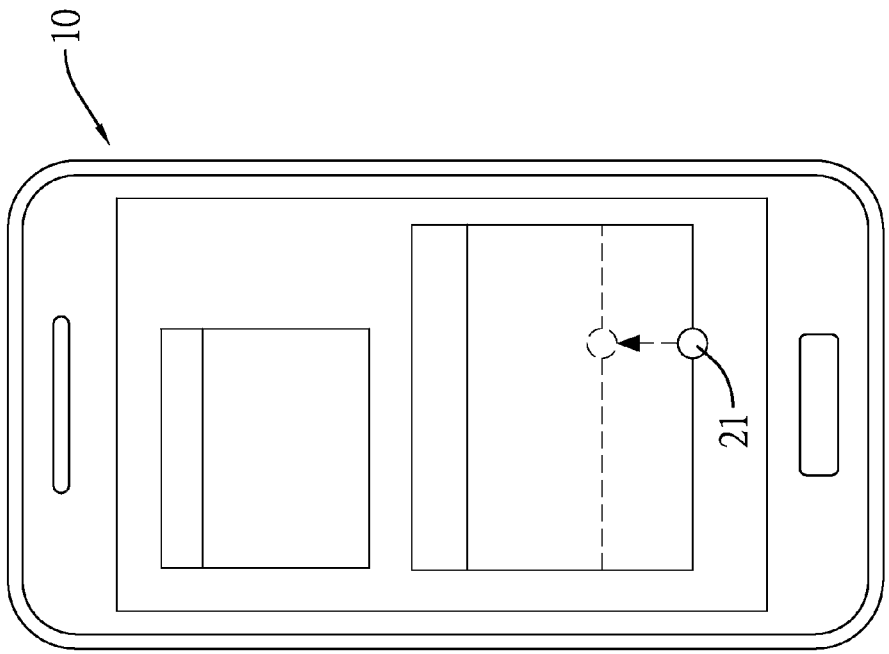
FIGS. 20A-20B are diagrams for a touch gesture according to a window-edge-adjusting command.
Figure 20A:
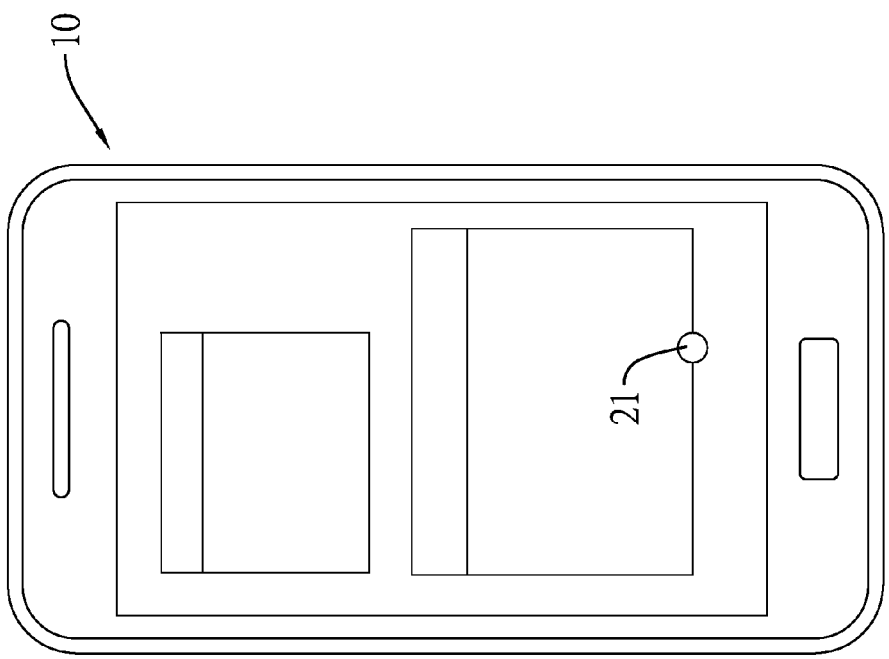

With reference to FIG. 20A, when no touch point is detected on the title bar of any one of the multiple windows but a touch point 21 is detected on an edge of one of the windows, the controller 13 determines whether the window touched by the touch point 21 is operated in the restore mode.

When the window touched by the touch point 21 is operated in the restore mode, the controller 13 determines whether the touch point 21 moves along a trace as a touch gesture. With reference to FIG. 20B, when the touch point 21 moves along the trace, the controller 13 executes a window-edge-adjusting command. The position of the edge of the window touched by the touch point 21 is thus repositioned according to the position of the touch point 21.

In conclusion, the present invention identifies the window control command according to the touch point on the title bar of the touched window. Hence, the touch gestures of the present invention are different from the conventional gestures of a touch device. In addition, the touch gestures of the present invention are not complicated. The user can easily memorize the touch gestures of the present invention. The user can use two fingers to control the window by one order and use three fingers to control the window by two orders. For example, when a window is operated in a minimum mode, the user can use two fingers moving toward the +y edge of the visible area 110 to restore the window, or use three fingers moving toward the +y edge of the visible area 110 to directly maximize the window.

Figure 21B:
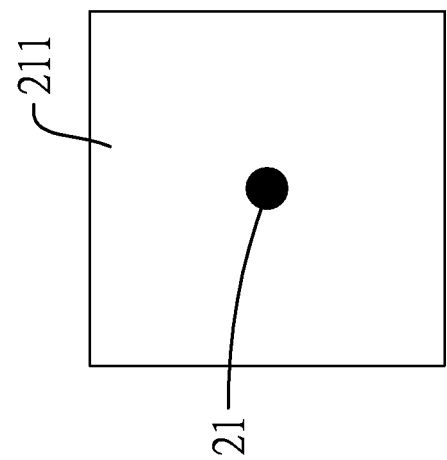
FIG. 21B is a diagram of a touch point and an effective touch area.
Figure 21A:
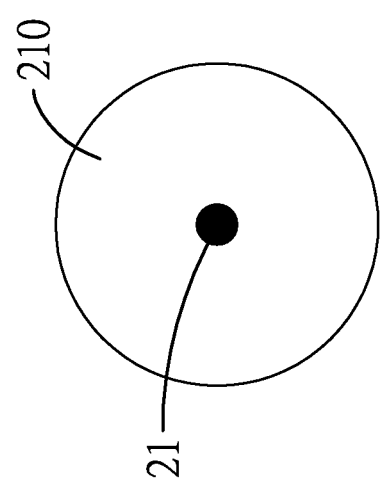
FIG. 21A is a diagram of a touch region and a touch point.

With reference to FIG. 21A, when the user touches the touch interface, the controller 13 detects a touch region 210. The controller 13 then defines the touch point 21 from the touch region 210 for identifying the touch gestures. With reference to FIG. 21B, the controller 13 can further define an effective touch area 211 around the touch point 21. The effective touch area 211 can be rectangular or in any other shape. The effective touch area 211 is a determining area that is expanded from the touch point 21. Although the touch point 21 is not located on the edge but in the effective touch area 211 that covers the edge of the window, the controller 13 still determines an effective touch.

Although the present invention is described above through the preferred embodiments and the accompanying drawings, they are not intended to limit the present invention. Various modifications, omissions and changes made by those skilled in the art to the form and content of the embodiments still fall within the protection scope of the present invention.

What is claimed is:

1. A method for identifying a window control command in a multi-window system, the method executed by an electronic device having a touch interface displaying multiple windows each respectively having a title bar, the method comprising the steps of:
providing a plurality of window control commands for controlling a window on the touch interface, the plurality of window control commands including moving, resizing, maximizing and minimizing the window and being assigned with a plurality of touch point combinations, respectively, the plurality of touch point combinations being defined by different numbers of touch points on the touch interface;
detecting one of the plurality of touch point combinations on the touch interface;
determining whether the detected touch point combination is on the title bar of a touched window selected from the multiple windows;
determining a movement of the detected touch point combination in a trace;
determining whether the movement of the detected touch point combination forms a touch gesture; and
executing a window control command assigned to the detected touch point combination, according to the determined touch gesture;
wherein the touch gesture is only performed on the title bar.

2. The method as claimed in claim 1, wherein the touch gesture is identified according to the steps of:
determining that the detected touch point combination is located on the title bar of the touched window operated in a restore mode; and
determining that the detected touch point combination moves along a trace to form the touch gesture, such that the window control command is identified as a window-moving command.

3. The method as claimed in claim 1, wherein the touch gesture is identified according to the steps of:
determining that the detected touch point combination as a first touch point action is located on the title bar of the touched window operated in a restore mode; and
determining a second touch point action on the touch interface excluded from the title bar of the touched window to form the touch gesture, such that the window control command is identified as a window-scaling command.

4. The method as claimed in claim 3, wherein the touched window is resized according to a position of the second touch point action.

5. The method as claimed in claim 1, wherein a +x edge, a −x edge, a +y edge and a −y edge are defined on the touch interface, and the touch gesture is identified according to the steps of:
determining whether the detected touch point combination is defined by two touch points or three touch points;
determining that the two touch points or the three touch points are located on the title bar of the touched window operated in a restore mode; and
determining that the two touch points or the three touch points move toward the +y edge to form the touch gesture, such that the window control command is identified as a window-maximizing command.

6. The method as claimed in claim 1, wherein a +x edge, a −x edge, a +y edge and a −y edge are defined on the touch interface, and the touch gesture is identified according to the steps of:
determining whether the detected touch point combination is defined by three touch points;
determining that three touch points are located on the title bar of the window operated in a minimum mode; and
determining that the three touch points move toward the +y edge to form the touch gesture, such that the window control command is identified as a window-maximizing command.

7. The method as claimed in claim 1, wherein a +x edge, a −x edge, a +y edge and a −y edge are defined on the touch interface, and the touch gesture is identified according to the steps of:
  determining whether the detected touch point combination is defined by two touch points;
  determining that the two touch points are located on the title bar of the window operated in a minimum mode; and
  determining that the two touch points move toward the +y edge to form the touch gesture, such that the window control command is identified as a window-restoring command.

8. The method as claimed in claim 1, wherein a +x edge, a −x edge, a +y edge and a −y edge are defined on the touch interface, and the touch gesture is identified according to the steps of:
  determining whether the detected touch point combination is defined by two touch points;
  determining that the two touch points are located on the title bar of the window operated in a maximum mode; and
  determining that the two touch points move toward the −y edge to form the touch gesture, such that the window control command is identified as a window-restoring command.

9. The method as claimed in claim 1, wherein a +x edge, a −x edge, a +y edge and a −y edge are defined on the touch interface, and the touch gesture is identified according to the steps of:
  determining whether h detected touch point combination is defined by three touch points;
  determining that the three touch points are located on the title bar of the touched window operated in a maximum mode; and
  determining that the three touch points move toward the −y edge to form the touch gesture, such that the window control command is identified as a window-minimizing command.

10. The method as claimed in claim 1, wherein a +x edge, a −x edge, a +y edge and a −y edge are defined on the touch interface, and the touch gesture is identified according to the steps of:
  determining whether the detected touch point combination is defined by two touch points or three touch points;
  determining that the two touch points or the three touch points are located on the title bar of the touched window operated in a restore mode; and
  determining that the two touch points or the three touch points move toward the −y edge to form the touch gesture, such that the window control command is identified as a window-minimizing command.

11. The method as claimed in claim 1, wherein a +x edge, a −x edge, a +y edge and a −y edge are defined on the touch interface, and the touch gesture is identified according to the steps of:
  determining whether the detected touch point combination is defined b at least two touch points;
  determining that the at least two touch points are located on the title bar of the touched window; and
  determining that the at least two touch points move toward the +x edge or the −x edge to form the touch gesture, such that the window control command is identified as a window-closing command.

12. The method as claimed in claim 1, wherein a +x edge, a −x edge, a +y edge and a −y edge are defined on the touch interface, and the touch gesture is identified according to the steps of:
  determining whether the detected touch point combination is defined by four touch points;
  determining that the four touch points are located on the title bar of the touched window; and
  determining that the four touch points move toward the +y edge to form the touch gesture, such that the window control command is identified as a window-topmost-mode command.

13. The method as claimed in claim 1, wherein a +x edge, a −x edge, a +y edge and a −y edge are defined on the touch interface, and the touch gesture is identified according to the steps of:
  determining whether the detected touch point combination is defined by four touch points;
  determining that the four touch points are located on the title bar of the touched window; and
  determining that the four touch points move toward the −y edge to form the touch gesture, such that the window control command is identified as a window-topmost-mode disabling command.

14. The method as claimed in claim 1, wherein when no touch point combination is located on the title bar of any one of the multiple windows, the method executes the steps of:
  detecting five touch points on the touch interface;
  determining whether the five touch points are located on an information region of one window, which is operated in a restore mode, selected from the multiple windows;
  determining whether the five touch points move away from each other when the five touch points are on the information region of said selected window; and
  executing a window-scale-up command when the five touch points move away from each other.

15. The method as claimed in claim 1, wherein when no touch point combination is located on the title bar of any one of the multiple windows, the method executes the steps of:
  detecting five touch points on the touch interface;
  determining whether the five touch points are located on an information region of one window, which is operated in a restore mode, selected from the multiple windows;
  determining whether the five touch points move approaching each other when the five touch points are on the information region of said selected window; and
  executing a window-scale-down command when the five touch points move approaching each other.

16. The method as claimed in claim 1, wherein when no touch point combination is located on the title bar of any one of the multiple windows, the method executes the steps of:
  detecting four touch points on the touch interface;
  determining whether the four touch points are located on an information region of one window, which is operated in a restore mode, selected from the multiple windows;
  determining whether the four touch points move along a trace when the four touch points are on the information region of said selected window; and
  executing a window-moving command when the four touch points move along the trace.

17. The method as claimed in claim 1, wherein when no touch point combination is located on the title bar of any one of the multiple windows, the method executes the steps of:

determining whether the touch point combination is on an edge of one window, which is operated in a restore mode, selected from the multiple windows;

determining whether the touch point combination moves when the touch point combination is on the edge of said selected window; and executing a window-edge-adjusting command when the touch point combination on the edge of said selected window moves.

18. The method as claimed in claim 1, wherein in the step of determining the touch point combination, an effective touch area is defined around the touch point combination.

19. An electronic device having:

a touch interface; and a controller electrically connected to the touch interface and controlling the touch interface to display multiple windows, each window having a title bar, the controller being configured to perform a plurality of window control commands for controlling a window on the touch interface, the plurality of window control commands including moving, resizing, maximizing and minimizing the window and being assigned with a plurality of touch point combinations, respectively, the plurality of touch point combinations being defined by different numbers of touch points on the touch interface;

wherein the controller:

detects one of the plurality of touch point combinations on the touch interface;

determines whether the detected touch point combination is on the title bar of a touched window selected from the multiple windows;

determines a movement of the detected touch point combination in a trace;

determines whether the movement of the detected touch point combination forms a touch gesture; and executes a window control command assigned to the detected touch point combination, according to the determined touch gesture;

wherein the touch gesture is only performed on the title bar; and wherein touch gestures formed by different numbers of touch points result in different window control commands.

* * * * *